(12) United States Patent
Sun et al.

(10) Patent No.: US 12,459,015 B2
(45) Date of Patent: Nov. 4, 2025

(54) PHOTOVOLTAIC CLEANING SYSTEM AND CLEANING METHOD

(71) Applicant: Huzhou Leapting Technology Co., LTD, Zhejiang (CN)

(72) Inventors: Xin Sun, Huzhou (CN); Tao Yu, Huzhou (CN); Liangliang Bai, Huzhou (CN)

(73) Assignee: Huzhou Leapting Technology Co., LTD, Zhejiang (CN)

( * ) Notice: Subject to any disclaimer, the term of this patent is extended or adjusted under 35 U.S.C. 154(b) by 0 days.

(21) Appl. No.: 18/553,230

(22) PCT Filed: Mar. 23, 2023

(86) PCT No.: PCT/CN2023/083346
§ 371 (c)(1),
(2) Date: Sep. 29, 2023

(87) PCT Pub. No.: WO2024/021643
PCT Pub. Date: Feb. 1, 2024

(65) Prior Publication Data
US 2025/0073762 A1    Mar. 6, 2025

(30) Foreign Application Priority Data
Jul. 27, 2022  (CN) .......................... 202210889493.3

(51) Int. Cl.
*B08B 13/00*        (2006.01)
*B08B 3/02*         (2006.01)
(Continued)

(52) U.S. Cl.
CPC .............. *B08B 13/00* (2013.01); *B08B 3/024* (2013.01); *B25J 11/0085* (2013.01); *B25J 18/00* (2013.01);
(Continued)

(58) Field of Classification Search
CPC ......... B25J 11/0085; B25J 18/00; G06T 7/73; G06T 7/0002; G06T 2207/30204;
(Continued)

(56) References Cited

U.S. PATENT DOCUMENTS 10,899,015 B2 *  1/2021  Barth ..................... B25J 9/1697
11,638,939 B2 *  5/2023  Hartman .................. B08B 7/02
                                                      700/108
(Continued)

FOREIGN PATENT DOCUMENTS

CN      106712694 A     5/2017
CN      107947723 A     4/2018
(Continued)

OTHER PUBLICATIONS

Author: Ren, Guoli (Authorized official), International Search Authority China (ISA/CN) Title: International search report (for PCT/CN2023/083346) Date: Jun. 8, 2023.
(Continued)

*Primary Examiner* — Benjamin L Osterhout
(74) *Attorney, Agent, or Firm* — Woodard, Emhardt, Henry, Reeves & Wagner, LLP

(57) ABSTRACT

The invention discloses a photovoltaic cleaning system and a cleaning method. The system comprises an autonomous navigation mobile device, a robotic arm with a connecting end and a carrying end, and a cleaning robot, wherein the connecting end is connected to the mobile device, and the carrying end can connect the cleaning robot. The system has a cleaning state and a carrying state. In the cleaning state, the cleaning robot cleans the solar modules, and the carrying end separates from the cleaning robot. In the carrying state, the carrying end connects and carries the cleaning robot to a preset position on the solar modules. In the cleaning process, the robotic arm and the cleaning robot can be
(Continued)

separated without hard connection between them. The vibration transmitted to the cleaning robot when the mobile device moves on uneven grounds is reduced, improving the stability of the cleaning robot during the operation.

8 Claims, 3 Drawing Sheets

(51) Int. Cl.
- *B25J 11/00* (2006.01)
- *B25J 18/00* (2006.01)
- *G06T 7/00* (2017.01)
- *G06T 7/73* (2017.01)
- *H02S 40/10* (2014.01)

(52) U.S. Cl.
CPC .............. *G06T 7/0002* (2013.01); *G06T 7/73* (2017.01); *H02S 40/10* (2014.12); *B08B 3/02* (2013.01); *B08B 2240/00* (2013.01); *G06T 2207/10028* (2013.01); *G06T 2207/10048* (2013.01); *G06T 2207/30204* (2013.01); *Y02E 10/50* (2013.01)

(58) Field of Classification Search
CPC . G06T 2207/10048; G06T 2207/10028; B08B 3/024; B08B 13/00; B08B 3/02; B08B 2240/00; H02S 40/10; Y02E 10/50
See application file for complete search history.

(56) References Cited

U.S. PATENT DOCUMENTS

| | | | |
|---|---|---|---|
| 2011/0137458 A1 | 6/2011 | Hisatani et al. | |
| 2012/0152877 A1* | 6/2012 | Tadayon | F24S 25/10 901/30 |
| 2017/0063293 A1* | 3/2017 | Parrott | F24S 40/20 |
| 2018/0241343 A1* | 8/2018 | Jiang | F24S 40/20 |
| 2019/0056744 A1* | 2/2019 | Li | G05D 1/0219 |
| 2022/0032446 A1* | 2/2022 | Jiang | B25J 5/005 |

FOREIGN PATENT DOCUMENTS

| | | | | |
|---|---|---|---|---|
| CN | 207655548 U | * | 7/2018 | |
| CN | 113255502 A | | 8/2021 | |
| CN | 115121528 A | | 9/2022 | |
| CN | 118353361 A | * | 7/2024 | ............. B08B 13/00 |
| CN | 119182358 A | * | 12/2024 | ............... B08B 1/40 |
| WO | WO-2011061347 A2 | * | 5/2011 | ............ B66F 11/044 |

OTHER PUBLICATIONS

Author: Ren, Guoli (Authorized official), International Search Authority China (ISA/CN) Title: Written opinion (for PCT/CN2023/083346) Date: Jun. 8, 2023.

* cited by examiner

In the process of cleaning the solar modules by the cleaning robot, obtaining first image data of the solar modules through a first image unit installed on a carrying end of a robotic arm, wherein the robotic arm is installed on an autonomous navigation mobile device ⸺ S101

Processing the first image data based on visual recognition algorithms to determine whether a preset handling condition is met between adjacent solar modules ⸺ S102

In response to the distance between the adjacent solar modules meeting the preset handling condition, controlling the power supply to an electronically controlled attracting device installed on the carrying end of the robotic arm so that the electronically controlled attracting device attracts the cleaning robot, and the robotic arm drives the cleaning robot to move, and after the cleaning robot moves to the adjacent solar modules, the power supply of the electronically controlled attracting device is controlled, so that the electronically controlled attracting device and the cleaning robot are separated, and the robotic arm is separated from the cleaning robot ⸺ S103

FIG. 3

PHOTOVOLTAIC CLEANING SYSTEM AND CLEANING METHOD

FIELD OF THE DISCLOSURE

The invention relates to the field of photovoltaics, and further relates to a photovoltaic cleaning system and a cleaning method.

BACKGROUND

Photovoltaic power generation is a technology that directly converts light energy into electrical energy by utilizing the photovoltaic effect of the semiconductor interface. It is mainly composed of solar panels (modules), controllers and inverters, and the main components are composed of electronic components. After the solar cells are connected in series, they can be packaged and protected to form large-area solar modules, and then be combined with power controllers and other components to form a photovoltaic power generation device.

The generation characteristics of the photovoltaic power generation device requires that it can only be set in the outdoor environment such as in the wild during the power generation process. During the generation process, the photovoltaic glass panel will inevitably accumulate dust, bird droppings, sand and other stains. Unremoved stains will greatly reduce power generation efficiency.

At present, photovoltaic cleaning robots using cleaning brush as the main method are commonly used to remove the accumulated stains on photovoltaic glass panels. In the actual situation, some photovoltaic power generations are installed on uneven sites such as hills and mountains. There will inevitably be height differences between adjacent photovoltaic supports, which will affect the stability of the photovoltaic cleaning robots. On the other hand, the existing photovoltaic cleaning robots are also unable to operate smoothly on photovoltaic supports with large spans and large angle changes. Existing cleaning robots in the form of rolling brushes are usually unable to clean the firmly adhered stains on the photovoltaic glass panel.

On the other hand, the existing photovoltaic cleaning systems are usually only capable of cleaning the front side of the photovoltaic glass panel, and cannot effectively clean the rear side of the photovoltaic glass panel.

SUMMARY

In order to solve the aforementioned technical problems, the present application is provided. The embodiments of the present application provide a photovoltaic cleaning system and a cleaning method. During the cleaning operation of the solar modules by the cleaning robot, the robotic arm is separated from the cleaning robot, and there is no hard connection between the two parts, which can reduce the vibration transmitted from the autonomous navigation mobile device moving on the uneven grounds to the cleaning robot, and can improve the stability of the cleaning robot during operation.

According to one aspect of the present application, a photovoltaic cleaning system is provided for cleaning solar modules, comprising:
an autonomous navigation mobile device;
a robotic arm, having a connecting end and a carrying end, with the connecting end connected to the autonomous navigation mobile device;
a cleaning robot; wherein the carrying end of the robotic arm is configured to be connectable to the cleaning robot, and the photovoltaic cleaning system has a cleaning state and a carrying state, wherein in the cleaning state, the cleaning robot is suitable for cleaning the solar modules, and the carrying end is separated from the cleaning robot, while in the carrying state, the carrying end is configured to be connectable to the cleaning robot and capable of carrying the cleaning robot to a preset position of the solar modules.

In the above-mentioned photovoltaic cleaning system, a visual recognition mechanism can be further comprised, wherein the visual recognition mechanism comprises a first image acquisition unit and a first image processing unit, wherein the first image acquisition unit is installed at the carrying end to obtain the first image data of the s solar modules, and the first image processing unit is configured to process the first image data based on visual recognition algorithms to determine whether the adjacent solar module satisfies a preset carrying condition, and when the preset carrying condition is met, the carrying end of the robotic arm is connected to the cleaning robot, to transport the cleaning robot to the adjacent solar module.

In the above-mentioned photovoltaic cleaning system, an electronically controlled attracting device can be further comprised, which is installed at the carrying end, and an attracting part that matches the electronically controlled attracting device is configured at a preset position of the cleaning robot, wherein by controlling the power supply of the electronically controlled attracting device, the electronically controlled attracting device is configured to be switched between an attracting state and a disengaged state, wherein in the attracting state, the electronically controlled attracting device attracts the attracting part, so as to be able to move the cleaning robot, while in the disengaged state, the electronically controlled attracting device is separated from the attracting part, so that the robotic arm is separated from the cleaning robot.

In the above-mentioned photovoltaic cleaning system, an identification mechanism can be further comprised, wherein the identification mechanism comprising a first identifier and a plurality of the first identification marks, wherein the first identification marks are located on preset positions of the solar modules; wherein the first identifier is installed at the carrying end of the robotic arm, and the first identifier is configured to identify the first identification marks, to determine the relative position of the carrying end on the plane where a solar module locates.

In the above-mentioned photovoltaic cleaning system, a flushing mechanism can be further comprised, wherein the flushing mechanism comprises a container, a flushing gun and a connecting hose, wherein the container is mounted on the autonomous navigation mobile device, and the flushing gun is installed on the cleaning robot, and one end of the connecting hose is connected to the container, while the other end is connected to the flushing gun, wherein the flushing gun is configured to extract flushing liquid from the container to flush the solar modules.

In the above-mentioned photovoltaic cleaning system, the flushing mechanism can further comprise a second image acquisition unit and a second image recognition unit, wherein the second image acquisition unit is installed on the cleaning robot, and is used to obtain the second image data of the solar modules during a cleaning operation of the solar modules by the cleaning robot, and the second image recognition unit is configured to process the second image data based on visual identification algorithms to identify areas to be flushed on the solar modules, wherein after the second image recognition unit identifies the areas to be flushed, the flush gun is controlled to spray flushing liquid onto the area or areas to be flushed.

In the above-mentioned photovoltaic cleaning system, a judgment mechanism can be further comprised, wherein the judgment mechanism comprises a thermal infrared imager and an infrared camera installed on the cleaning robot, wherein the thermal infrared imager is used to obtain temperature data of the solar modules, and the infrared camera is used to obtain three-dimensional image data of the solar modules; wherein the judgment mechanism is configured to judge whether the solar modules are abnormal based on the temperature data and the three-dimensional image data.

In the above-mentioned photovoltaic cleaning system, a cleaning arm can be further comprised, wherein the cleaning arm has a cleaning assembly installed on the autonomous navigation mobile device, and when the autonomous navigation mobile device moves in a gap between two adjacent rows of the solar modules, and when the cleaning robot cleans a front side of the solar modules in one row, the cleaning arm is configured to carry the cleaning assembly to clean a rear side of the solar modules in the other row.

In the above-mentioned photovoltaic cleaning system, an electronically controlled attracting device mounted at the carrying end of the robotic arm can be further comprised, wherein the electronically controlled attracting device attracts the cleaning assembly to constitute the cleaning arm.

According to another aspect of the present application, a cleaning method for a photovoltaic cleaning system is provided, comprising:
  obtaining the first image data of solar modules through a first image acquisition unit installed at a carrying end of a robotic arm, during a cleaning operation of the solar modules by a cleaning robot, wherein the robotic arm is installed on an autonomous navigation mobile device;
  processing the first image data based on visual recognition algorithms to determine whether a preset carrying condition is met between adjacent solar modules;
  in response to a distance between the adjacent solar modules meeting the preset carrying condition, controlling a power supply to an electronically controlled attracting device installed at the carrying end of the robotic arm, so that the electronically controlled attracting device attracts the cleaning robot, and the robotic arm drives the cleaning robot to move, wherein after the cleaning robot moves to an adjacent solar module, the power supply of the electronically controlled attracting device is controlled so that the electronically controlled attracting device and the cleaning robot are separated, and the robotic arm is separated from the cleaning robot.

The above-mentioned cleaning method for a photovoltaic cleaning system can further comprise:
  acquiring the second image data of the solar modules through a second image acquisition unit installed on the cleaning robot;
  wherein the second image data is processed based on visual recognition algorithms to identify areas to be flushed on the solar modules, and in response to the identification of areas to be flushed, a flush gun installed on the cleaning robot is controlled to spray flushing liquid onto areas to be flushed, wherein the flushing gunconnects to a container mounted on the autonomous navigation mobile device through a connecting hose.

The above-mentioned cleaning method for a photovoltaic cleaning system can further comprise:
  obtaining the temperature data of the solar modules through a thermal infrared imager installed on the cleaning robot;
  obtaining the three-dimensional image data of the solar modules through an infrared camera installed on the cleaning robot;
  determining whether the solar modules are abnormal based on the temperature data and the three-dimensional image data.

In the above-mentioned cleaning method for a photovoltaic cleaning system, when the robotic arm and the cleaning robot are in a disengaged state, the carrying end of the robotic arm is configured to attract a cleaning assembly, and when the autonomous navigation mobile device moves in a gap between two adjacent rows of the solar modules, and the cleaning robot cleans the front side of the solar modules in one row, the autonomous navigation mobile device is suitable for carrying the cleaning assembly that the robotic arm attracts to perform cleaning operations on the rear side of the solar modules in the other row.

Compared with the prior arts, the photovoltaic cleaning system and cleaning method provided by the present application have at least one of the following beneficial effects:
1. In the photovoltaic cleaning system and cleaning method provided in the present application, during the cleaning operation of the solar modules by the cleaning robot, the robotic arm is separated from the cleaning robot, and there is no hard connection between the two parts, which can reduce the vibration transmitted from the autonomous navigation mobile device to the cleaning robot when the mobile device is moving on uneven grounds, improving the stability of the cleaning robot during operation.
2. In the photovoltaic cleaning system and cleaning method provided by the present application, the photovoltaic cleaning system further includes a cleaning arm. The cleaning arm has a cleaning assembly, and the cleaning assembly is installed on the autonomous navigation mobile device. When the autonomous navigation mobile device moves in the gap between two adjacent rows of solar modules, and when the cleaning robot cleans the front side of the solar modules in one row, the cleaning arm is suitable for carrying the cleaning assembly to clean the rear side of the solar modules in the other row, to achieve all-round cleaning of the solar modules from multiple angles.

BRIEF DESCRIPTION OF THE DRAWINGS

The above and other objects, features and advantages of the present application will become more apparent in the detailed description of the embodiments of the present application in conjunction with the appended drawings. The appended drawings are used to provide a further understanding of the embodiments of the present application, and constitute a part of the description and are used to explain the present application together with the embodiments of the present application, but do not constitute a limitation to the present application. In the drawings, the same reference numbers generally refer to the same components or steps.

FIG. 3 is a flow chart of a cleaning method of a photovoltaic cleaning system according to a preferred embodiment of the present invention.

DESCRIPTION OF THE ILLUSTRATED EMBODIMENTS

In order to more clearly describe the embodiments of the present invention or the technical solutions in the prior arts, the specific embodiments of the present invention will be described below with reference to the appended drawings. Obviously, the appended drawings in the following description are only some embodiments of the present invention. For those of ordinary skilled in the art, other drawings can also be obtained from these drawings without creative efforts, and other embodiments can be obtained.
Exemplary System.

Figure 1:
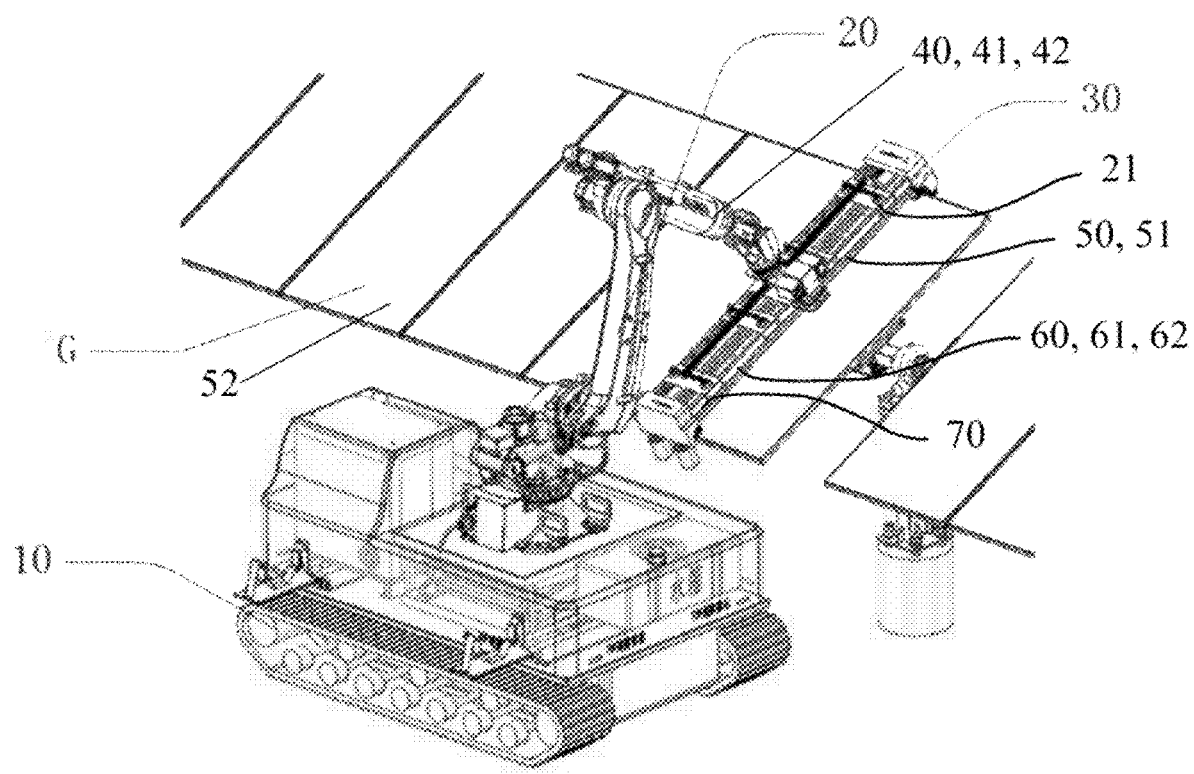
FIG. 1 is an application diagram of a photovoltaic cleaning system of a preferred embodiment of the present invention.
Figure 2:
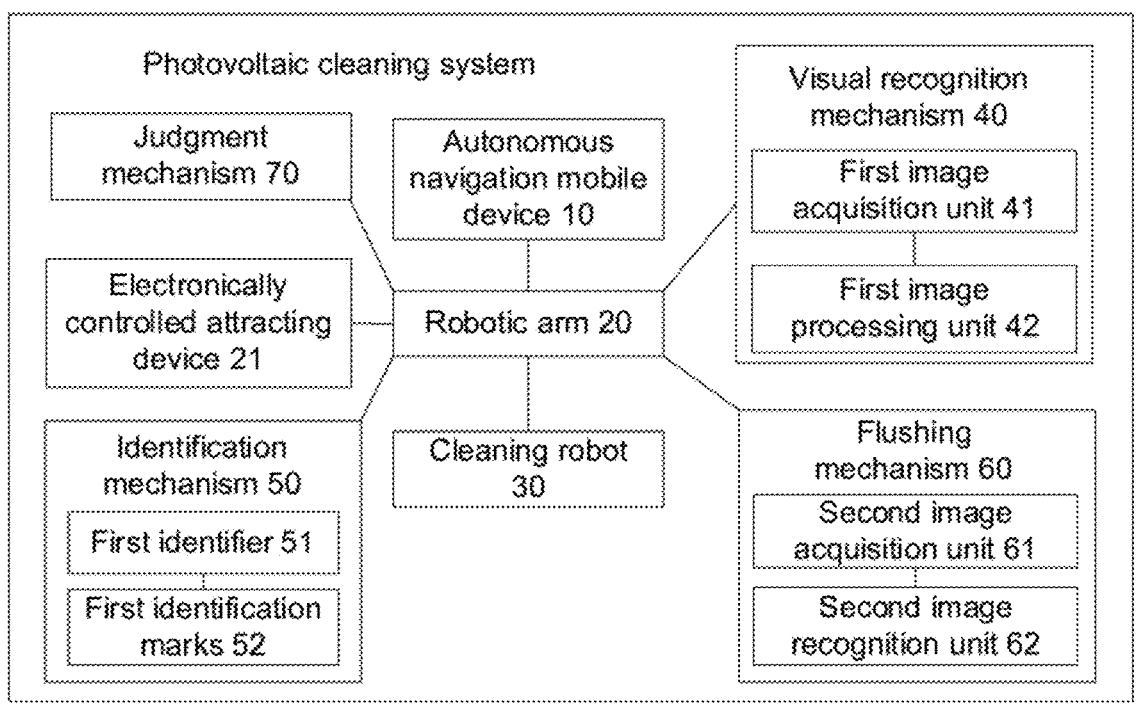
FIG. 2 is a block diagram of a photovoltaic cleaning system of a preferred embodiment of the present invention.

FIG. 1 illustrates an application diagram of a photovoltaic cleaning system according to an embodiment of the present application, and FIG. 2 illustrates a block diagram of the photovoltaic cleaning system according to an embodiment of the present application.

As shown in FIG. 1 and FIG. 2, the photovoltaic cleaning system comprises an autonomous navigation mobile device 10, a robotic arm 20 and a cleaning robot 30. The robotic arm 20 has a connecting end and a carrying end. The connecting end is connected to the autonomous navigation mobile device 10; and the carrying end of the robotic arm 20 is suitable for connecting to the cleaning robot 30. The photovoltaic cleaning system has a cleaning state and a carrying state. In the cleaning state, the cleaning robot 30 is suitable for cleaning the solar modules G, and the carrying end is separated from the cleaning robot. In the carrying state, the carrying end is configured to be connected to the cleaning robot 30 and capable of carrying the cleaning robot 30 to a preset position of the solar modules G.

In the present application, during the cleaning operation of the solar modules G by the cleaning robot 30, the robotic arm 20 is separated from the cleaning robot 30, and there is no hard connection between the two parts, which can reduce the vibration transmitted to the cleaning robot 30 when the autonomous navigation mobile device 10 moves on the uneven grounds, which can improve the stability of the cleaning robot 30 during operation.

The autonomous navigation mobile device 10 is equipped with laser radar, RTK (Real-time kinematic), ultrasonic sensors and other necessary components for autonomous mapping, autonomous navigation and other autonomous operation of unmanned driving, so that the autonomous navigation mobile device 10 can operate in an unmanned manner on the site where the solar modules G are built.

The cleaning robot 30 includes upper-end walking wheels and lower-end walking wheels. During the work process, the cleaning robot 30 is configured to be adapted the solar modules G, wherein the upper-end walking wheels and the lower-end walking wheels can respectively overlap with the upper and lower ends of the solar modules G, so that the cleaning robot 30 can be controlled to move along the solar modules G by driving the walking wheels to rotate, and the solar modules G can be cleaned.

Specifically, the photovoltaic cleaning system further includes a visual recognition mechanism 40. The visual recognition mechanism 40 includes a first image acquisition unit 41 and a first image processing unit 42. The first image acquisition unit 41 is installed at the carrying end and is used to acquire the first image data of the solar modules. The first image processing unit 42 can process the first image data based on visual recognition algorithms to determine whether the preset carrying conditions are met between the adjacent solar modules. When the preset carrying conditions are met, the carrying end of the robotic arm 20 is connected to the cleaning robot 30, and can carry the cleaning robot 30 to the adjacent solar modules.

For example, a preset carrying condition is that the distance between the adjacent solar modules is greater than a preset distance, or that the height difference between the adjacent solar modules is greater than a preset distance, or that a row of the solar modules has already been cleaned and the cleaning robot 30 needs to be transported to the next row of the solar modules, and so on.

Preferably, the first image acquisition unit 41 is a camera, the first image data is image and/or video data, and based on the image or video data of the solar modules acquired by the camera, the first image processing unit 42 can process the image or video data based on the visual recognition algorithms to determine whether the distance between adjacent solar modules is greater than a preset distance, or whether the height difference between adjacent solar modules is greater than a preset distance, or after cleaning one row of the solar modules, the cleaning robot 30 needs to be transported to the next row of the solar modules. When the first image processing unit 42 processes the first image data and determines that the preset carrying conditions are met between the adjacent solar modules, it gives a feedback to the controller, and the controller controls the robotic arm 20 to take action.

Specifically, the photovoltaic cleaning system further includes an electronically controlled attracting device 21 installed on the robotic arm 20, and at a preset position of the cleaning robot 30, an attracting part matching the electronically controlled attracting device 21 is provided. By controlling the power supply of the electronically controlled attracting device 21, the electronically controlled attracting device 21 can be controlled to switch between an attracting state and a disengaged state. In the attracting state, the electronically controlled attracting device 21 attracts the attracting part, so that the cleaning robot 30 can be driven to move. In the disengaged state, the electronically controlled attracting device 21 is separated from the attracting part, and the robotic arm 20 is separated from the cleaning robot 30. For example, when the cleaning robot 30 needs to be transported, the robotic arm 20 is firstly moved to align with the cleaning robot 30, and then the electronically controlled attracting device 21 is powered on, so that the electronically controlled attracting device 21 attracts the cleaning robot 30, and drives the cleaning robot 30 to move. After the cleaning robot 30 is transported to the next solar module by the robotic arm 20, the power supply to the electronically controlled attracting device 21 is cut, so that the electronically controlled attracting device 21 releases the cleaning robot 30.

The electronically controlled attracting device 21 is preferably a vacuum suction device or an electromagnetic attracting plate. The attracting part of the cleaning robot 30 has a structure with a flat surface, so as to facilitate the attracting and connection of the vacuum suction device or the electromagnetic attracting plate. In a variant embodiment, the electronically controlled attracting device 21 can also be mounted on the cleaning robot 30. In another variant embodiment, an electronically controlled attracting device 21 is installed both on the carrying end of the robotic arm 20 and the cleaning robot 30.

The photovoltaic cleaning system also includes an identification mechanism 50. The identification mechanism 50 includes a first identifier 51 and a plurality of first identification marks 52. The first identification marks 52 are located at preset positions of the solar modules, and the first identifier 51 is installed on the robotic arm 20. The first identifier 51 can identify the first identification marks 52, to determine the relative position of the carrying end on the plane where a solar module is located. Optionally, the first image acquisition unit 41 is a 3D camera, and is further configured to measure the distance between the carrying end and the solar module.

Preferably, the first identification marks 52 are RFID (RFID: Radio Frequency Identification) tags, and the first identifier 51 is an RFID identifier, and the first identification marks 52 are multiple in number and are distributed at multiple positions of the solar modules. The relative position of the carrying end of the robotic arm 20 to the solar modules can be determined by identifying the first identification marks 52 by the RFID identifier. The first image acquisition unit 41 is a 3D camera, and can also acquire the depth data, so as to measure the distance between the carrying end and the solar modules, so as to control the robotic arm 20 to transport the cleaning robot 30.

Optionally, the first identification marks 52 are two-dimensional code information. The two-dimensional code information can be acquired by the first image acquisition unit 41, and the two-dimensional code can be recognized by the first image processing unit 42 to determine the relative position between the carrying end and the solar modules. Optionally, the distance between the carrying end and the solar module can also be determined by a laser radar mounted on the autonomous navigation mobile device 10.

Specifically, a fixed coordinate system, that is, a world coordinate system, is established with the ground on which the autonomous navigation mobile device 10 moves as a reference plane, and the world coordinate system is static. The coordinate system of the autonomous navigation mobile device 10 is established with the center of the autonomous navigation mobile device 10 as the coordinate origin, and the correspondence between the world coordinate system and the autonomous navigation mobile device 10 can be calculated through the movement of the autonomous navigation mobile device 10 on the ground. The robotic arm 20 coordinate system is established with the connecting end of the robotic arm 20 as the coordinate origin. Because the connecting end of the robotic arm 20 is fixed at the center of the autonomous navigation mobile device 10, the robotic arm 20 coordinate system coincides with the coordinate system of the autonomous navigation mobile device 10. Joint coordinate systems are established with the rotational connection of each joint of the robotic arm 20 as the coordinate origin, and the correspondence between each joint coordinate system and the robotic arm coordinate system can be established based on the lengths of the joints of the robotic arm 20. The electronically controlled attracting device 21 is rotatably mounted on the carrying end of the robotic arm 20, and an attracting coordinate system is established with the rotational connection between the electronically controlled attracting device 21 and the carrying end as the coordinate origin. A target coordinate system where the solar modules are located is established with reference to the first identification marks 52 on the solar modules, and the center of the target coordinate system can be located either at the center or at an edge of the solar modules.

In the work process, when the cleaning robot 30 needs to be transported by the robotic arm 20, the first image acquisition unit 41 is used to obtain the image recognition data to determine the coordinates of the cleaning robot 30 in the target coordinate system. In a variant embodiment, the coordinates of the cleaning robot 30 in the target coordinate system can also be acquired by a second identifier equipped on the cleaning robot 30 by recognizing a number of the first identification marks 52 on the solar modules. After that, the first identifier 51 identifies a number of the first identification marks 52 to determine the target of the robotic arm 20 in the target coordinate system. The distance between the carrying end and the solar modules is measured by the first image acquisition unit 41. The angle that each joint of the robotic arm 20 needs to rotate is calculated based on the distance. The autonomous navigation mobile device 10 is controlled to drive the robotic arm 20 to move, so that the carrying end of the robotic arm 20 coincides with the coordinates of the cleaning robot 30 in the target coordinate system, and the robotic arm 20 is controlled to move in the direction of the cleaning robot 30, so that the electronically controlled attracting device 21 contacts and attracts the cleaning robot 30. The robotic arm 20 is controlled to carry the cleaning robot 30 to move away from the solar modules, and then the autonomous navigation mobile device 10 is controlled to drive the robotic arm 20 to move and to carry the cleaning robot 30 to the next solar module or the next row of the solar modules.

The photovoltaic cleaning system further includes a flushing mechanism 60. The flushing mechanism 60 includes a container, a flushing gun and a connecting hose. The container is installed on the autonomous navigation mobile device 10, and the flushing gun is installed on the cleaning robot 30. One end of the connecting hose is connected to the container, and the other end is connected to the flushing gun, through which the flushing liquid in the container can be extracted to wash the solar modules. Preferably, the flushing liquid stored in the container is water, and the flushing gun is a high-pressure water gun. By spraying the flushing liquid onto the solar modules, the stains on the solar modules that cannot be removed by a brush can be removed, thereby improving the cleaning efficiency. In a variant embodiment, the flushing gun can also be mounted on the robotic arm 20.

Specifically, the flushing mechanism further includes a second image acquisition unit 61 and a second image recognition unit 62. The second image acquisition unit 61 is installed on the cleaning robot 30 and is used to obtain the second image data of the solar modules during the cleaning robot 30 cleans the solar modules, and the second image recognition unit 62 can process the second image data based on visual recognition algorithms to identify areas to be flushed on the solar modules. After the second image recognition unit 62 identifies the areas to be flushed, the flushing gun is controlled to spray flushing liquid to the areas to be flushed.

For example, when there are stubborn stains on the solar modules, there will be a large difference between the second image data and that of the solar modules in a clean state. The areas with stains on the solar modules can be identified based on the visual recognition algorithms and are marked as the areas to be flushed. Then the areas to be flushed are flushed by the flushing gun. By priorly detecting the areas to be flushed on the solar modules, and then by only flushing the areas to be flushed on the solar modules, the flushing liquid can be saved and the consumption of the flushing liquid can be reduced.

The photovoltaic cleaning system further includes a judgment mechanism 70, and the judgment mechanism 70 includes a thermal infrared imager and an infrared camera installed on the cleaning robot 30, and the thermal infrared imager is used to obtain the temperature data of the solar modules, while the infrared camera is used to obtain three-dimensional image data of the solar modules. The judgment mechanism 70 can judge whether the solar modules are abnormal or not, based on the temperature data and the three-dimensional image data. In a variant embodiment, the judgment mechanism 70 may also be located on the carrying end of the robotic arm 20, so as to better perform the image capturing of the solar modules.

For example, when the internal circuit of the solar modules is damaged or the modules are abnormal, the local temperature of the solar modules may increase, and in severe cases, the solar modules may be severely damaged. During the operation of the cleaning robot 30, the temperature data of the solar modules is acquired by the thermal infrared imager, so that it can be detected whether the internal circuit of the solar modules is damaged. Obtaining the three-dimensional data of the solar modules through the infrared camera can detect whether there are internal defects such as cracks, fragments, faulty welding and broken grids inside the solar module.

Furthermore, the photovoltaic cleaning system includes a cleaning arm. The cleaning arm has a cleaning assembly, and the cleaning assembly is installed on the autonomous navigation mobile device 10. When the autonomous navigation mobile device 10 moves in a gap between two adjacent rows of the solar modules, and when the cleaning robot 30 cleans the front side of the solar modules in one row, the cleaning arm is suitable for carrying the cleaning assembly to clean the rear side of the solar modules in the other row.

The cleaning assembly is a high-pressure air gun, or a high-pressure water gun, or a combination of a high-pressure air gun and a high-pressure water gun, and the cleaning assembly can also be a cleaning device such as a brush. The specific embodiments of the cleaning assembly should not be construed as a limitation on this application.

In a variant embodiment, the electronically controlled attracting device 21 on the carrying end of the robotic arm 20 attracts the cleaning assembly to constitute the cleaning arm, and the cleaning assembly has a attracting part suitable for connecting to the electronically controlled attracting device 21. When the cleaning robot 30 needs to be transported, the electronically controlled attracting device 21 releases the cleaning assembly and attracts the cleaning robot 30. By controlling the power supply of the electronically controlled attracting device 21, the electronically controlled attracting device 21 can be switched between an attracting state and a disengaged state. In the attracting state, the electronically controlled attracting device 21 attracts the cleaning robot 30 or the cleaning assembly; and in the disengaged state, the electronically controlled attracting device 21 is separated from the cleaning robot 30 or the cleaning assembly. That is to say, the robotic arm 20 can attract either the cleaning robot 30 or the cleaning assembly. When the cleaning robot 30 does not need to be transported, the electronically controlled attracting device 21 on the robotic arm 20 can attract the cleaning assembly to clean the rear side of the solar modules in an adjacent row.

Exemplary Method.

FIG. 3 illustrates a flow chart of a cleaning method of a photovoltaic cleaning system according to an embodiment of the present application.

As shown in FIG. 3, the cleaning method of the photovoltaic cleaning system includes:
- S101, in the process of cleaning the solar modules by the cleaning robot, obtaining the first image data of the solar modules through a first image unit installed on a carrying end of a robotic arm, wherein the robotic arm is installed on an autonomous navigation mobile device;
- S102, processing the first image data based on visual recognition algorithms to determine whether a preset carrying condition is met between adjacent solar modules;
- S103, in response to the distance between the adjacent solar modules meeting the preset carrying condition, controlling the power supply to an electronically controlled attracting device installed on the carrying end of the robotic arm so that the electronically controlled attracting device attracts the cleaning robot, and the robotic arm drives the cleaning robot to move, and after the cleaning robot moves to the adjacent solar modules, the power supply of the electronically controlled attracting device is controlled, so that the electronically controlled attracting device and the cleaning robot are separated, and the robotic arm is separated from the cleaning robot.

The cleaning method of the photovoltaic cleaning system further includes:
- S104, acquiring second image data of the solar modules through a second image acquisition unit installed on the cleaning robot;
- S105, processing the second image data based on visual recognition algorithms to identify areas to be flushed on the solar modules, and in response to areas to be flushed being identified, controlling a flushing gun installed on the cleaning robot to move toward the areas to be flushed. The areas to be flushed are sprayed with flushing liquid, wherein the flushing gun is connected to a container installed on the autonomous navigation mobile device through a connecting hose.

The cleaning method of the photovoltaic cleaning system further includes:
- S106, acquiring temperature data of the solar modules through a thermal infrared imager installed on the cleaning robot;
- S107, acquiring three-dimensional image data of the solar modules through an infrared camera installed on the cleaning robot;
- S108, based on the temperature data and the three-dimensional image data, determining whether the solar modules are abnormal.

When the robotic arm and the cleaning robot are in a separated state, the carrying end of the robotic arm can attract the cleaning assembly. And when the autonomous navigation mobile device is in the gap between two adjacent rows of the solar modules, while the cleaning robot cleans the front side of the solar modules in one row, the autonomous navigation mobile device is suitable for carrying the robotic arm to attract the cleaning assembly to clean the rear side of the solar modules in the other row.

Here, those skilled in the art can understand that each step in the above-mentioned cleaning method of the photovoltaic cleaning system has been introduced in detail in the description of the photovoltaic cleaning system above, and therefore, repeated descriptions thereof will be omitted.

As described above, the photovoltaic cleaning system according to the embodiments of the present application can be implemented in various wireless terminals, such as a server for a photovoltaic cleaning system, and the like. In one example, the photovoltaic cleaning system according to the embodiments of the present application may be integrated into a wireless terminal as a software module and/or a hardware module. For example, the photovoltaic cleaning system may be a software module in the operating system of the wireless terminal, or may be an application program developed for the wireless terminal. Of course, the photovoltaic cleaning system may also be one of the variety hardware modules of the wireless terminal.

Alternatively, in another example, the photovoltaic cleaning system and the wireless terminal can also be separate devices, and the photovoltaic cleaning system can be connected to the wireless terminal through a wired and/or wireless network, and the data is transmitted in an agreed data format.

Exemplary computer program product and computer readable storage medium.

In addition to the methods and apparatuses described above, embodiments of the present application may also be computer program products comprising computer program instructions that, when executed by a processor, cause the processor to perform the steps in the cleaning method of the photovoltaic cleaning system according to various embodiments of the present application described in the section "exemplary methods" above in this description.

The computer program product can be written program codes for performing the operations of the embodiments of the present application in any combination of one or more programming languages, including object-oriented programming languages, such as Java, C++, etc., also including conventional procedural programming languages, such as "C" language or similar programming languages. The program codes may execute entirely on the user computing device, partly on the user device, as a stand-alone software package, partly on the user computing device and partly on a remote computing device, or entirely on the remote computing device or server.

In addition, embodiments of the present application may also be computer-readable storage media having computer program instructions stored thereon. The computer program instructions, when executed by a processor, cause the processor to perform the steps in the cleaning method of the photovoltaic cleaning system according to various embodiments of the present application described in the section "exemplary methods" above in this description.

The computer-readable storage medium may employ any combination of one or more readable media. The readable medium may be a readable signal medium or a readable storage medium. The readable storage medium may include, for example, but not limited to, electrical, magnetic, optical, electromagnetic, infrared, or semiconductor systems, apparatuses or devices, or a combination of any of the above. More specific examples (non-exhaustive list) of readable storage media include: electrical connections with one or more wires, portable disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the above.

The basic principles of the present application have been described above in conjunction with specific embodiments. However, it should be pointed out that the advantages, benefits, effects, etc. mentioned in the present application are only examples rather than limitations, and these advantages, benefits, effects, etc., are not considered to be required for each embodiment of this application. In addition, the specific details disclosed above are only for the purpose of example and easy understanding, rather than limiting, and the above-mentioned details do not limit the application to be implemented by using the above-mentioned specific details.

The block diagrams of devices, equipment, apparatuses, and systems referred to in this application are merely illustrative examples and are not intended to require or imply that the connections, arrangements, or configurations must be in the manner shown in the block diagrams. As those skilled in the art will appreciate, these devices, equipment, apparatuses, systems may be connected, arranged, configured in any manner. Words such as "including", "comprising", "having" and the like are open-ended words meaning "including but not limited to" and are used interchangeably therewith. As used herein, the words "or" and "and" refer to and are used interchangeably with the word "and/or" unless the context clearly dictates otherwise. As used herein, the word "such as" refers to and is used interchangeably with the phrase "such as but not limited to".

It should also be pointed out that in the apparatus, equipment and method of the present application, each component or each step can be decomposed and/or recombined. Such disaggregation and/or recombination should be considered as equivalents of the present application.

The above description of the disclosed aspects is provided to enable any person skilled in the art to make or use this application. Various modifications to these aspects will be readily apparent to those skilled in the art, and the general principles defined herein may be applied to other aspects without departing from the scope of the application. Therefore, this application is not intended to be limited to the aspects shown herein but is to be accorded the widest scope consistent with the principles and novel features disclosed herein.

The foregoing description has been presented for the purposes of illustration and description. Furthermore, this description is not intended to limit the embodiments of the application to the forms disclosed herein. Although a number of example aspects and embodiments have been discussed above, those skilled in the art will recognize certain variations, modifications, changes, additions and sub-combinations thereof.

The invention claimed is:

1. A photovoltaic cleaning system, used for cleaning solar modules, characterized in that it comprises:
    an autonomous navigation mobile device;
    a robotic arm, having a connecting end and a carrying end, with the connecting end connected to the autonomous navigation mobile device;
    a cleaning robot, configured to be connected to the carrying end of the robotic arm;
    wherein the photovoltaic cleaning system has a cleaning state and a carrying state, wherein in the cleaning state, the cleaning robot is suitable for cleaning the solar modules, and the carrying end is separated from the cleaning robot, while in the carrying state, the carrying end is configured to be connectable to the cleaning robot and capable of carrying the cleaning robot to a preset position of the solar modules; and
    a flushing mechanism including a container, a flushing gun and a connecting hose, wherein the container is mounted on the autonomous navigation mobile device, and the flushing gun is installed on the cleaning robot, and one end of the connecting hose is connected to the container, while the other end is connected to the flushing gun, wherein the flushing gun is configured to extract flushing liquid from the container to flush the solar modules.

2. The photovoltaic cleaning system according to claim 1, further comprising a visual recognition mechanism, wherein the visual recognition mechanism comprises a first image acquisition unit and a first image processing unit;

wherein the first image acquisition unit is installed at the carrying end to obtain first image data of the solar modules, and the first image processing unit is configured to process the first image data based on visual recognition algorithms to determine whether an adjacent solar module satisfies a preset carrying condition;

and when the preset carrying condition is satisfied, the carrying end of the robotic arm is connected to the cleaning robot, to transport the cleaning robot to the adjacent solar module.

3. The photovoltaic cleaning system according to claim 2, further comprising an electronically controlled attracting device installed at the carrying end, and an attracting part that matches the electronically controlled attracting device and is configured at a preset position of the cleaning robot;

wherein by controlling the power supply of the electronically controlled attracting device, the electronically controlled attracting device is configured to be switched between an attracting state and a disengaged state;

wherein in the attracting state, the electronically controlled attracting device attracts the attracting part, so as to be able to move the cleaning robot, while in the disengaged state, the electronically controlled attracting device is separated from the attracting part, so that the robotic arm is separated from the cleaning robot.

4. The photovoltaic cleaning system according to claim 3, further comprising an identification mechanism, wherein the identification mechanism comprises a first identifier and a plurality of first identification marks, wherein the first identification marks are located on preset positions of the solar modules;

wherein the first identifier is installed at the carrying end of the robotic arm, and the first identifier is configured to identify the first identification marks, to determine the relative position of the carrying end on the plane where a solar module locates.

5. The photovoltaic cleaning system according to claim 2, wherein the flushing mechanism further comprises a second image acquisition unit and a second image recognition unit, wherein the second image acquisition unit is installed on the cleaning robot, and is used to obtain second image data of the solar modules during a cleaning operation of the solar modules by the cleaning robot, and the second image recognition unit is configured to process the second image data based on visual identification algorithms to identify areas to be flushed on the solar modules, wherein after the second image recognition unit identifies the areas to be flushed, the flushing gun is controlled to spray flushing liquid onto the areas to be flushed.

6. The photovoltaic cleaning system according to claim 5, further comprising a judgment mechanism, wherein the judgment mechanism comprises a thermal infrared imager and an infrared camera installed on the cleaning robot, wherein the thermal infrared imager is used to obtain temperature data of the solar modules, and the infrared camera is used to obtain three-dimensional image data of the solar modules;

wherein the judgment mechanism is configured to judge whether the solar modules are damaged based on the temperature data and the three-dimensional image data.

7. The photovoltaic cleaning system according to claim 1, further comprising a cleaning arm, wherein the cleaning arm has a cleaning assembly installed on the autonomous navigation mobile device, and when the autonomous navigation mobile device moves in a gap between two adjacent rows of the solar modules, and when the cleaning robot cleans a front side of the solar modules in one row, the cleaning arm is configured to carry the cleaning assembly to clean a rear side of the solar modules in the other row.

8. The photovoltaic cleaning system according to claim 7, further comprising an electronically controlled attracting device mounted at the carrying end of the robotic arm, wherein the electronically controlled attracting device attracts the cleaning assembly to constitute the cleaning arm.

* * * * *